United States Patent [19]

Schippl

[11] Patent Number: 4,984,605

[45] Date of Patent: Jan. 15, 1991

[54] CONDUCTING TUBE

[75] Inventor: Klaus Schippl, Isernhagen, Fed. Rep. of Germany

[73] Assignee: Kabelmetal Electro, Hanover, Fed. Rep. of Germany

[21] Appl. No.: 299,256

[22] Filed: Jan. 23, 1989

[30] Foreign Application Priority Data

Feb. 3, 1988 [DE] Fed. Rep. of Germany ....... 3803112

[51] Int. Cl.$^5$ .............................................. F16L 9/10
[52] U.S. Cl. ..................................... 138/149; 138/111; 138/113; 138/122; 138/148
[58] Field of Search ............... 138/111, 112, 113, 114, 138/148, 149, 121, 122, 173

[56] References Cited

U.S. PATENT DOCUMENTS

| 3,240,234 | 3/1966 | Bond et al. | 138/122 |
| 3,280,849 | 10/1966 | Rendos et al. | 138/149 |
| 3,512,581 | 5/1970 | Lawton | 138/114 |
| 3,565,118 | 2/1971 | Stearns | 138/149 |
| 3,595,275 | 7/1971 | Stearns et al. | 138/149 |
| 4,303,105 | 12/1981 | Rohner | 138/149 |
| 4,492,089 | 1/1985 | Rohnar et al. | 138/149 |
| 4,570,678 | 2/1986 | Ziemek et al. | 138/149 |
| 4,570,679 | 2/1986 | Schippl | 138/149 |

Primary Examiner—James E. Bryant, III
Attorney, Agent, or Firm—Peter C. Van Der Sluys

[57] ABSTRACT

Two concentric corrugated metal tubes have a space therebetween in which there is arranged a superinsulation layer. Between the inner tube and the superinsulation layer there is located a helical spacer to ensure an annular channel to facilitate the evacuation of the space between the corrugated tubes. The spacer is formed of interlaced strands to reduce heat conduction therethrough.

15 Claims, 2 Drawing Sheets

CONDUCTING TUBE

BACKGROUND OF THE INVENTION

1. Field of the Invention

This invention relates to conducting tubes for the transport of intensely cold media, and more particularly to a conducting tube comprising two corrugated metal tubes arranged concentrically with a superinsulation layer therebetween.

2. Description of the Prior Art

The term 'intensely cold media' in the sense of the invention refers to media with a temperature below 100 degrees K, e.g., liquefied gases such as helium, oxygen, nitrogen, etc.

For the transport of media of this type, a conducting tube is known from U.S. Pat. No. 3,240,234. In this conducting tube, a helically wound superinsulation layer serves as a spacer for the concentric tubes. The superinsulating layer comprises alternately superposed layers of insulating material and reflection material. This design involves a number of disadvantages. For example, in the case of a horizontal installation, the inner tube will be supported on the superinsulation with its own weight and the weight of the medium flowing in the inner tube. Since the superinsulation layer, in order to achieve the maximum possible insulating effect, must be loosely wound, the superinsulation layer below the inner tube will be compressed and will lose its optimal insulating action in that area. As a result of the compression, the inner tube will be displaced in its position with respect to the outer tube, so that an increased incidence of heat occurs in the area of the compressed superinsulation layer due to both the smaller separation and the lost insulation value. A further significant disadvantage is the fact that, particularly in the case of large lengths of the conducting tube, an evacuation of the superinsulation layer is not possible or is possible only with a large expenditure of time.

In another embodiment of a conducting tube shown in U.S. Pat. No. 3,595,275, a helically proceeding spacer is located on the inner tube. The superinsulation layer is wound over this spacer and is in contact with the inner tube in the regions located between two adjacent helices. Between the outer surface of the spacer and the inner surface of the outer tube, the superinsulation layer is very strongly compressed, so that an increased incidence of heat occurs at these points. With this design also, it is not possible to evacuate large lengths in an economical manner due to the contact between the superinsulation layer and the inner tube. In addition, this conducting tube is burdened by the disadvantage that the spacer helix consists of a strip of the superinsulation layer, whose individual layers will have to be bonded to each other in a separate working stage, e.g., by wrapping a thread around them, wrapping them in a foil, or by quilting. As a result, this design of the conducting tube becomes very expensive. During winding of the multi-layer spacer, problems appear, since the outer layers stretch while the inner layers are compressed.

SUMMARY OF THE INVENTION

The present invention contemplates a conducting tube that can be evacuated rapidly even for tube lengths of more than 20 meters and in which any compression of the superinsulation that may occur as a result of the contact forces of the inner tube is restricted to the smallest possible area. In addition, the invention provides that for approximately the same insulation value, a considerable volume of expensive superinsulation material can be saved.

The above benefits and advantages are realized by holding the superinsulation layer at a distance from the inner corrugated metal tube by means of a spacer applied helically to the inner corrugated metal tube, with the direction of winding of the superinsulation being opposite to the direction of winding of the spacer.

By means of the invention, a hollow space extending over the entire tube length is created between the inner tube and the innermost surface of the superinsulation layer. This structure makes possible a rapid and complete evacuation of the space between the inner and outer corrugated metal tubes. As a result of the better vacuum, the insulation value of the space between the metal tubes is increased. This increased insulation value allows the layer thickness of the superinsulation to be reduced to achieve an identical insulation value.

Another beneficial result is that a smaller diameter outer tube may be used to save material for the outer tube. Because of the smaller diameter of the outer tube, its surface is reduced, so that a smaller incidence of heat appears.

A further advantage of the reduced diameter is better flexibility of the conducting tube for an identical corrugation ratio.

According to an advantageous embodiment of the invention, the corrugation grooves of the inner metal tube are covered over by a foil. This foil, which is advantageously a metallized plastic foil, improves the radiation behavior of the surface of the stainless-steel inner tube.

The foil is appropriately applied helically and is in contact with the corrugation ridges. The width of the foil is dimensioned such that it covers at least two adjacent corrugation ridges.

The spacer is advantageously made with individual strands interlaced with each other. These strands, which appropriately have a circular cross-section, are only in point-wise contact with each other and also with the adjoining areas of the foil and of the inner layer of the superinsulation. Heat transport as a result of thermal conduction is thus reduced to a minimum.

For reasons of thermal conduction and also because of the flexibility, these strands are made of plastic. However, a noncombustible material, e.g., a mesh of ceramic material or of glass fibers, must be used for special applications, e.g., the transport of combustible media.

The superinsulation is formed of a plurality of dual layers, each dual layer including a metallized foil and an insulating layer. The dual layers are wound with overlapping band edges, with an overlap of between 10 and 75 percent. The greater the overlap, the greater will be the total thickness of the superinsulation. Thus it is possible, for example, with an overlap of 75 percent and six dual layers applied by six winding devices, to produce a superinsulation having a total thickness equivalent to 24 dual layers in one working step.

According to a further aspect of the invention, the outer tube can be selected to have an inside diameter in the region of the corrugation grooves, that is larger than the outer diameter of the superinsulation layer. A difference in diameter of 2 to 20 millimeters, preferably 3 to 7 millimeters, is preferred. This additional free cross-section also facilitates evacuation.

DESCRIPTION OF THE DRAWINGS

The invention will be explained in greater detail with reference to the embodiment represented schematically in the figures in which.

DESCRIPTION OF THE PREFERRED EMBODIMENT

Figure 1:
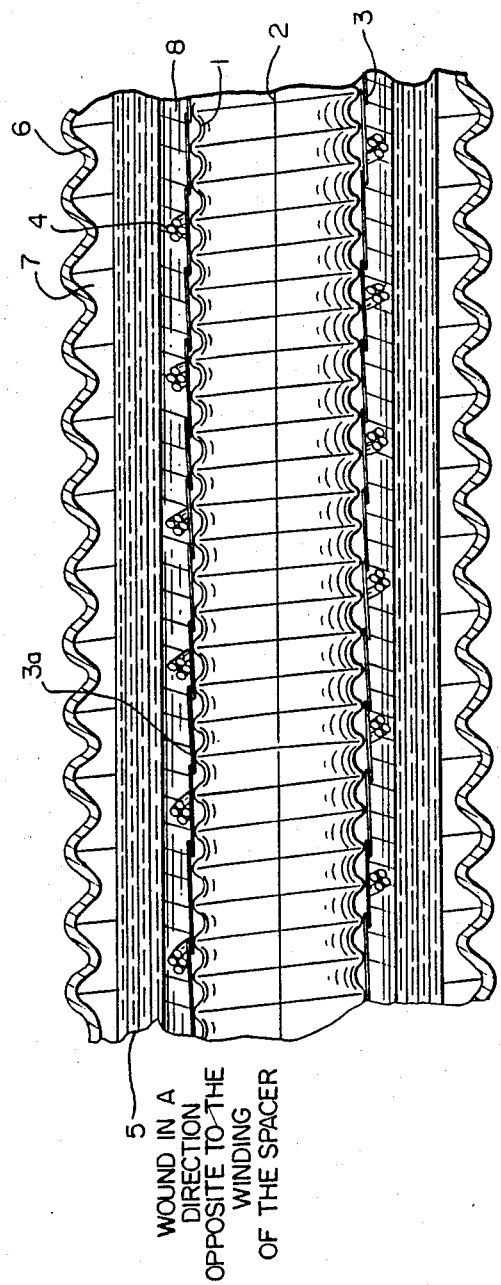
FIG. 1 is a cross-section of a conducting tube constructed in accordance with the invention.

A helically corrugated metal tube 1 is produced by continuous forming of a band of stainless steel to a split tube, welding of the slit 2, and corrugation of the tube using known techniques. On the outer corrugation ridges of the corrugated metal tube 1 there is located a foil 3, e.g., of aluminum or a plastic, whose surface is coated with aluminum. The width of the foil 3 is to be dimensioned such that it is in contact with at least two adjacent corrugation ridges. The foil 3 is wound helically onto the corrugated metal tube 1, with an overlap 3a of the band edges of at least 10 percent, based on the width of the foil 3.

Above the foil 3, a spacer 4 is helically wound, which consists advantageously of several strands of plastic interlaced with each other in a plait-like manner. Ceramic material or i glass fibers may be used instead of plastic. The cross-section of the strands is circular. Thus, this results in a point-wise contact of the individual strands with each other and also in a point-wise contact between the spacer 4 and the foil 3 and a superinsulation layer 5 located above it.

The superinsulation layer consists of alternate layers of metal foil or metal-coated plastic foil and layers of a nonwoven plastic material or of a nonwoven material such as glass fibers or ceramic material. During winding of the superinsulation layer 5, it is appropriate to wind together as a dual layer one metal foil or metal-coated plastic foil and one layer of nonwoven plastic material or nonwoven ceramic material or nonwoven glass-fiber material. In the case of helical winding, the winding of the superinsulation layer is also carried out in such a way that the band edges of each dual layer overlap. The minimum extent of overlap is to be assumed as 10 percent, based on the width of the dual layer of the superinsulation layer 5. A higher extent of overlapping will be selected if a greater thickness of the superinsulation layer 5 must be used. The overlap may be in the range of 10–75 percent.

Figure 2:
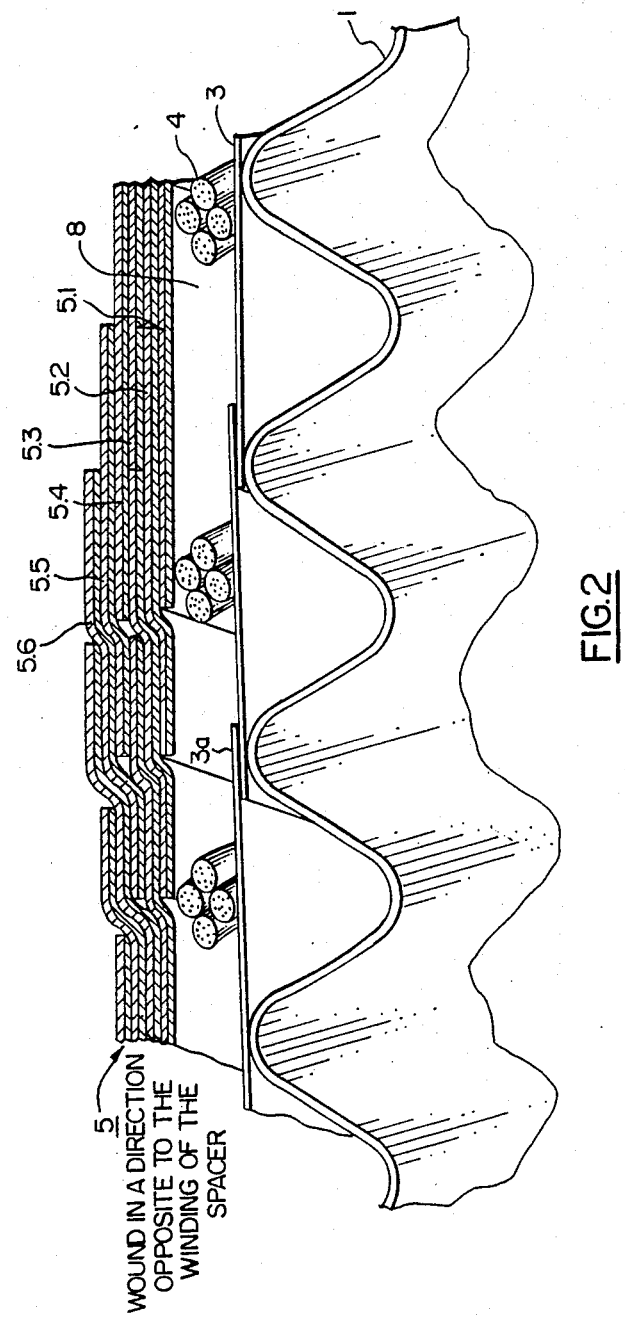
FIG. 2 is a cross-section of a portion of FIG. 1 showing greater detail.

Referring to FIG. 2, there is shown a more detailed illustration of the overlapping layers. The width of the material forming the superinsulation layer 5 should be sufficient to span two helices of the spacer 4 as shown by portion 5.1 of a first layer in FIG. 2. A sufficient width must be provided so that the superinsulation will not intrude into the spaces between the helices.

FIG. 2 illustrates two layers of superinsulation, each wrapped with a 66.67 percent overlap. A first layer comprising a foil and a fabric of ceramic fibers is shown in overlapping relationship as 5.1, 5.2 and 5.3. The second layer is represented by 5.4, 5.5 and 5.6, with the same degree of overlap. Thus, two layers with a 66.67 percent overlap provide six layers of insulation.

Above the superinsulation layer 5 there is arranged an outer corrugated metal tube 6 which, like the corrugated metal inner tube 1, is produced by forming of a stainless-steel band to a split tube, welding of the longitudinal edges, and subsequent corrugation of the tube. Between the superinsulation layer 5 and the outer corrugated metal tube there is located a gap 7.

The conducting tube shown, because of the production process, can be produced in almost unlimited length and is so flexible that it can be transported and installed on cable drums or in coil form like an electrical cable. Depending on the outside diameter of the outer corrugated metal tube 6, transportable lengths of up to 200 meters are possible.

As a result of the spacer 4, an annular gap 8 is located between the inner tube 1 and the superinsulation layer 5, which, together with the gap 7, ensures that the space between the inner tube 1 and the outer tube 6 can be evacuated rapidly and completely. The direction of winding of the layers of the superinsulation layer 5 is opposite to the direction of winding of the spacer 4, and care must also be taken that the length of lay of the spacer 4 is selected such that the inner layer of the superinsulation layer 5 is in contact with at least two adjacent helices of the spacer 4. As a result, a dimensionally stable annular space 8 is obtained.

The conducting tube according to the teaching of the invention is outstandingly suited for the transport of intensely cold media. In this case, the thermal-radiation-intensive region is located on the outside of the tube system. Here, very much higher temperatures prevail, as compared with the inner tube 1. These enter into the calculation of the radiated power in a fourth-power manner. Since the spacer 4 is located on the inside of the superinsulation layer 5, it absorbs a very small amount of radiation energy.

For comparative measurements, two insulated conducting tubes were produced, one conducting tube according to the state of the art, and one conducting tube according to the teaching of the invention.

|  | State of the Art | Invention |
|---|---|---|
| Outside diameter of inner tube | 44 mm | 44 mm |
| Space between inner tube and superinsulation | — | 3 mm |
| Thickness of superinsulation | 8 mm | 3 mm |
| Inside diameter of outer tube | 60 mm | 60 mm |
| Length of the conducting tube | 50 m | 50 m |

By means of a pump, the space between the inner tube 1 and outer tube 6 was evacuated for seven days and the power loss of the conducting tube was then measured by the evaporation measurement method. This resulted in a power loss that was 50 percent lower for the tube according to the invention.

The invention is not restricted to the embodiment shown in the figure. Thus, for example, for the transport of liquid helium, it may be meaningful to select a coaxial arrangement of four corrugated conducting tubes.

What is claimed is:

1. A conducting tube for the transport of intensely cold media, comprising:
   an inner corrugated metal tube;
   an outer corrugated metal tube arranged concentrically about said inner tube with an evacuated space therebetween;

a spacer applied helically to the inner corrugated metal tube;

a helically wound superinsulation layer disposed over the spacer and formed of alternately superposed layers of insulating material and reflecting material, the direction of winding of the superinsulation layer being opposite to the direction of winding of the spacer whereby the superinsulation layer is held at a distance from the inner corrugated metal tube; and the corrugation grooves of the inner corrugated metal tube are covered by a foil, the foil is in direct contact with the inner corrugated metal tube, the spacer is in direct contact with the foil, and the superinsulation is in direct contact with said spacer.

2. A conducting tube according to claim 1, wherein the foil is helically wrapped and is in contact with the corrugation ridges.

3. A conducting tube according to claim 1, wherein the foil comprises one of a group of materials including a metallized plastic and metal.

4. A conducting tube according to claim 1, wherein the spacer comprises individual strands interlaced with each other.

5. A conducting tube according to claim 3, wherein the spacer comprises individual strands interlaced with each other.

6. A conducting tube according to claim 1, wherein the superinsulation is wound with an overlap of between 10 and 75 percent.

7. A conducting tube according to claim 3, wherein the superinsulation is wound with an overlap of between 10 and 75 percent.

8. A conducting tube according to claim 4, wherein the superinsulation is wound with an overlap of between 10 and 75 percent.

9. A conducting tube according to claim 1, wherein the outside diameter of the superinsulation layer is between 2 and 20 mm smaller than the inside diameter of the outer corrugated metal tube.

10. A conducting tube according to claim 4, wherein the outside diameter of the superinsulation layer is between 2 and 20 mm smaller than the inside diameter of the outer corrugated metal tube.

11. A conducting tube according to claim 5, wherein the outside diameter of the superinsulation layer is between 2 and 20 mm smaller than the inside diameter of the outer corrugated metal tube.

12. A conducting tube according to claim 9, wherein the outside diameter of the superinsulation layer is between 3 and 7 mm smaller than the inside diameter of the outer corrugated metal tube.

13. A conducting tube according to claim 10, wherein the outside diameter of the superinsulation layer is between 3 and 7 mm smaller than the inside diameter of the outer corrugated metal tube.

14. A conducting tube according to claim 11, wherein the outside diameter of the superinsulation layer is between 3 and 7 mm smaller than the inside diameter of the outer corrugated metal tube.

15. A conducting tube according to claim 4, wherein the superinsulation is in point contact with strands of the spacer.

* * * * *